United States Patent
Simpson (10) Patent No.: US 8,453,802 B1
(45) Date of Patent: Jun. 4, 2013

(54) CAM ACTUATED BRAKE MECHANISM FOR ADJUSTABLE BEAM TROLLEY

(75) Inventor: Anthony Simpson, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1359 days.

(21) Appl. No.: 12/220,393

(22) Filed: Jul. 14, 2008

(51) Int. Cl.
*B61H 7/00* (2006.01)

(52) U.S. Cl.
USPC .............................. 188/41; 188/62; 105/148

(58) Field of Classification Search
USPC .................. 188/41, 42, 45, 62; 104/232, 224, 104/90–96; 105/148
See application file for complete search history.

(56) References Cited

U.S. PATENT DOCUMENTS

| | | | | |
|---|---|---|---|---|
| 2,175,286 A * | 10/1939 | Finch | ............................ | 104/257 |
| 3,212,455 A * | 10/1965 | Workman | .................... | 105/155 |
| 3,548,752 A * | 12/1970 | Karlstrom | ................. | 104/172.4 |
| 3,741,126 A * | 6/1973 | Ross | ............................... | 104/96 |
| 3,799,327 A * | 3/1974 | Schulz | .......................... | 198/718 |
| 3,897,735 A * | 8/1975 | Watts | ............................. | 104/166 |
| 4,326,466 A * | 4/1982 | Parry et al. | ................. | 104/172.4 |
| 4,454,818 A * | 6/1984 | Eccleston et al. | ............... | 104/98 |
| 5,293,812 A * | 3/1994 | Maki et al. | ........................ | 92/27 |
| 6,308,638 B1 * | 10/2001 | Pease | ............................ | 104/252 |
| 6,763,691 B1 * | 7/2004 | Rafferty | .......................... | 70/164 |
| 7,484,461 B2 * | 2/2009 | Britcher | ......................... | 104/89 |
| 2007/0101894 A1 * | 5/2007 | Britcher | .......................... | 104/89 |

* cited by examiner

*Primary Examiner* — Robert A Siconolfi
*Assistant Examiner* — James Hsiao
(74) *Attorney, Agent, or Firm* — James T. Shepherd (57) ABSTRACT

A brake mechanism for a beam trolley on a beam has a body member on the beam trolley adjacent the beam. The body member has a recess and axially aligned bores and a rotatable lateral pin extends through the aligned bores. The lateral pin has a rotatable elongate cam portion extending across the recess, and a brake pad is in the recess adjacent to the beam and abutting the cam portion. A handle is connected to the lateral pin for rotating the pin and the cam portion to displace the brake pad against the beam. The brake pad frictionally secures the beam trolley on the beam and locks the rotatable cam in place. Rounded end portions on opposite ends of the lateral pin and sleeve-like bushings between the axially aligned bores and rounded end portions permit rotation of the cam portion by the handle.

7 Claims, 8 Drawing Sheets

CAM ACTUATED BRAKE MECHANISM FOR ADJUSTABLE BEAM TROLLEY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is for securing a beam trolley on an I-beam or H-beam. More particularly, this invention is to a adjustable width beam hoist trolley having a manually activated friction brake to selectively and safely secure a loaded or unloaded beam trolley at a selected position along the length of the beam.

Figure 1:
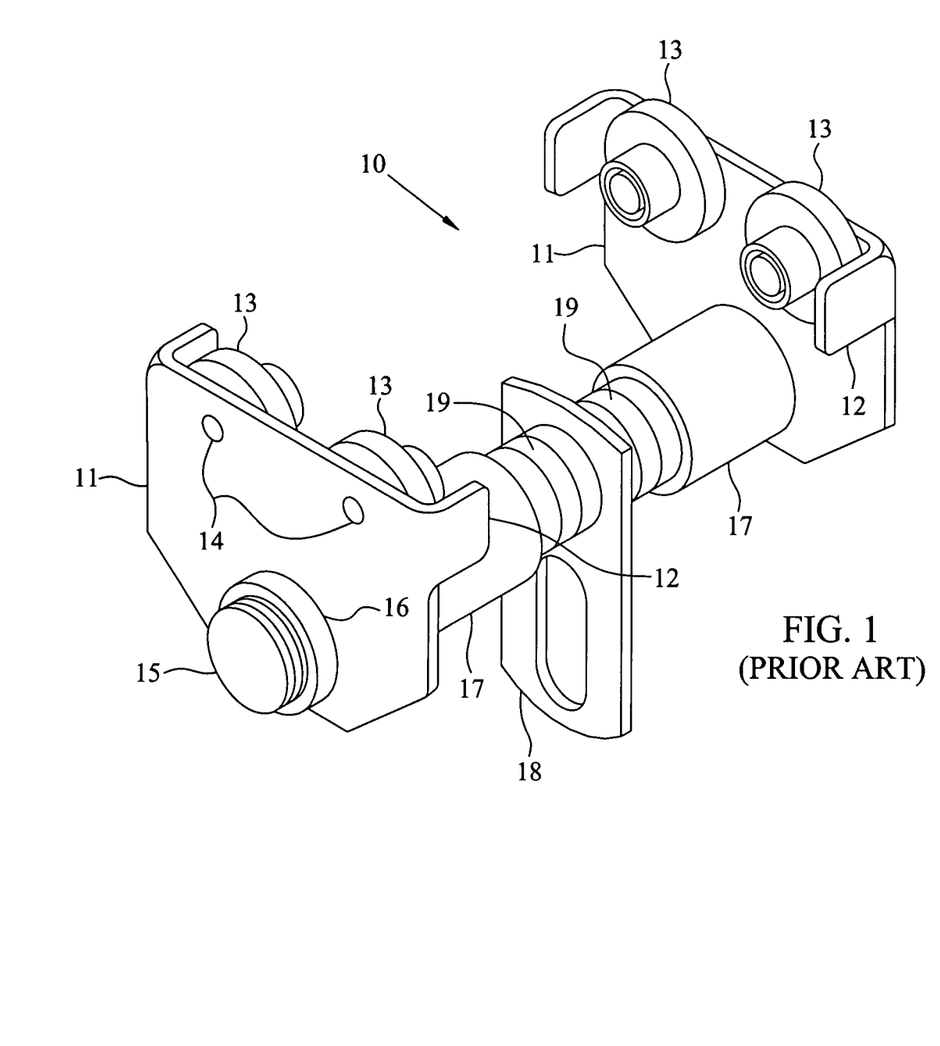
FIG. 1 is an isometric view of a typical commercially available beam trolley.
Figure 2:
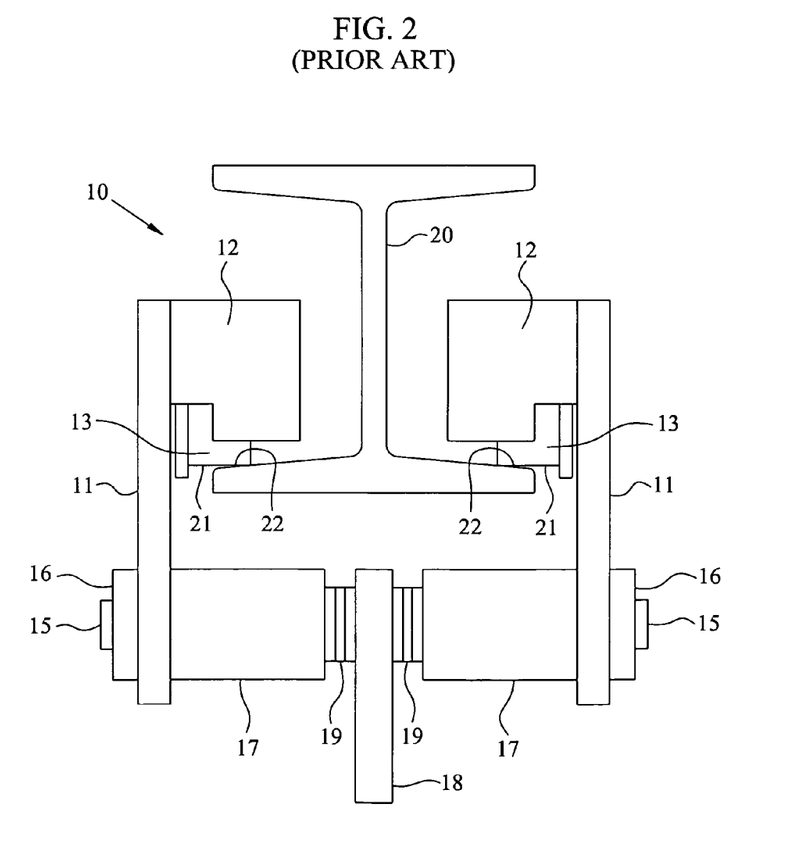
FIG. 2 is an end view of the commercially available beam trolley.

Adjustable beam trolleys are industry standard devices for permanent or temporary mounting of a hoist on a standard I-beam or H-beam. The beam trolleys provide vertical support and permit linear motion of the supported load as the trolley rolls along the length of the beam. Many adjustable beam trolleys are commercially available from a number of manufacturers and are called adjustable because they can be adjusted to accommodate differently sized I and H beams. FIGS. 1 and 2 show a typical commercially available adjustable beam trolley 10 having a pair of steel side plates 11 shaped with end-bumpers 12, and each side plate 11 mounts a pair of load bearing trolley wheels 13 on steel axles 14. A heavy-duty threaded steel bolt 15, having secured end-nuts 16 abutting the outsides of side plates 11, laterally extends through round openings (not shown) provided in both of side plates 11 and aligned bores (not shown) in inward extensions 17 of side plates 11. A steel load bearing hoist mount 18 is mounted midway on threaded bolt 15 where it extends between inward extensions 17 to receive and support a manual or automatic chain hoist connected to a load (not shown).

FIG. 2 shows in greater detail that an appropriate number of spacer washers 19 optionally can be provided on threaded bolt 15 on opposite sides of hoist mount 18. Spacer washers 19 assure the right separation of side plates 11 and trolley wheels 13 to properly fit beam trolley 10 on beam 20. This proper fit on beam 20 places the outer circumferential surfaces 21 of trolley wheels 13 on upper web surfaces 22 of beam 20 so that wheels 13 engage and longitudinally ride along beam 20 and transfer the load's weight to beam 20 via beam trolley 10. End nuts 16 are securely tightened on threaded bolt 16 to secure these components together when they have been properly fitted.

The contemporary beam trolleys such as those described above do not have a suitable operator-controlled means for fixedly securing them to the load bearing beams. This can create unsafe lifting of loads by the trolley and hazardous stowage of an unused, unsecured trolley under unstable ambient conditions, such as on those encountered on a ship underway at sea.

Thus, in accordance with this inventive concept, a need has been recognized in the state of the art for an operator actuated means to secure a beam trolley to a load bearing beam to prevent unwanted travel of the trolley along the beam.

SUMMARY OF THE INVENTION

The present invention provides a cam actuated brake mechanism that allows an operator to selectively secure a beam trolley on a supporting beam. The brake mechanism has a body member on the beam trolley adjacent to the beam. The body member has a recess and axially aligned bores and a rotatable lateral pin extends through the aligned bores. The lateral pin has a rotatable elongate cam portion extending across the recess, and a brake pad is in the recess adjacent to the beam and abutting the cam portion. A handle is connected to the lateral pin for rotating the pin and the cam portion to displace the brake pad against the beam. The brake pad frictionally secures the beam trolley on the beam and locks the rotatable cam in place. Rounded end portions on opposite ends of the lateral pin and sleeve-like bushings between the axially aligned bores and rounded end portions permit rotation of the cam portion by the handle. A pair of coiled springs in the recess urges the brake pad away from the body member upward and outward and the springs have securing means at opposite ends for coupling the springs to the brake pad and body member at the bottom of the recess. A load bearing hoist mount is integrally formed with the body member for bearing a load and is mounted midway on a laterally extending threaded bolt of the beam trolley. The body member has a transverse bore having the bolt extending through it, and the transverse bore, hoist mount, cam portion, and brake pad are in an essentially in-line arrangement in the brake mechanism to reduce generation of destabilizing torques.

An object of the invention is to provide a cam actuated brake mechanism that allows an operator to selectively secure a beam trolley on a supporting beam.

Another object of the invention is to provide a cam actuated brake mechanism to secure a loaded or unloaded beam trolley along the length of a supporting I- or H-beam.

Another object of the invention is to provide a brake mechanism capable of accommodating commercially available beam trolleys to provide for improved safety and handling.

Another object of the invention is to provide a brake mechanism for modifying a number of commercially available beam trolleys to improve safety and handling without compromising their inherent load-bearing capabilities.

These and other objects of the invention will become more readily apparent from the ensuing specification when taken in conjunction with the appended claims.

DESCRIPTION OF THE PREFERRED EMBODIMENT

Figure 3:
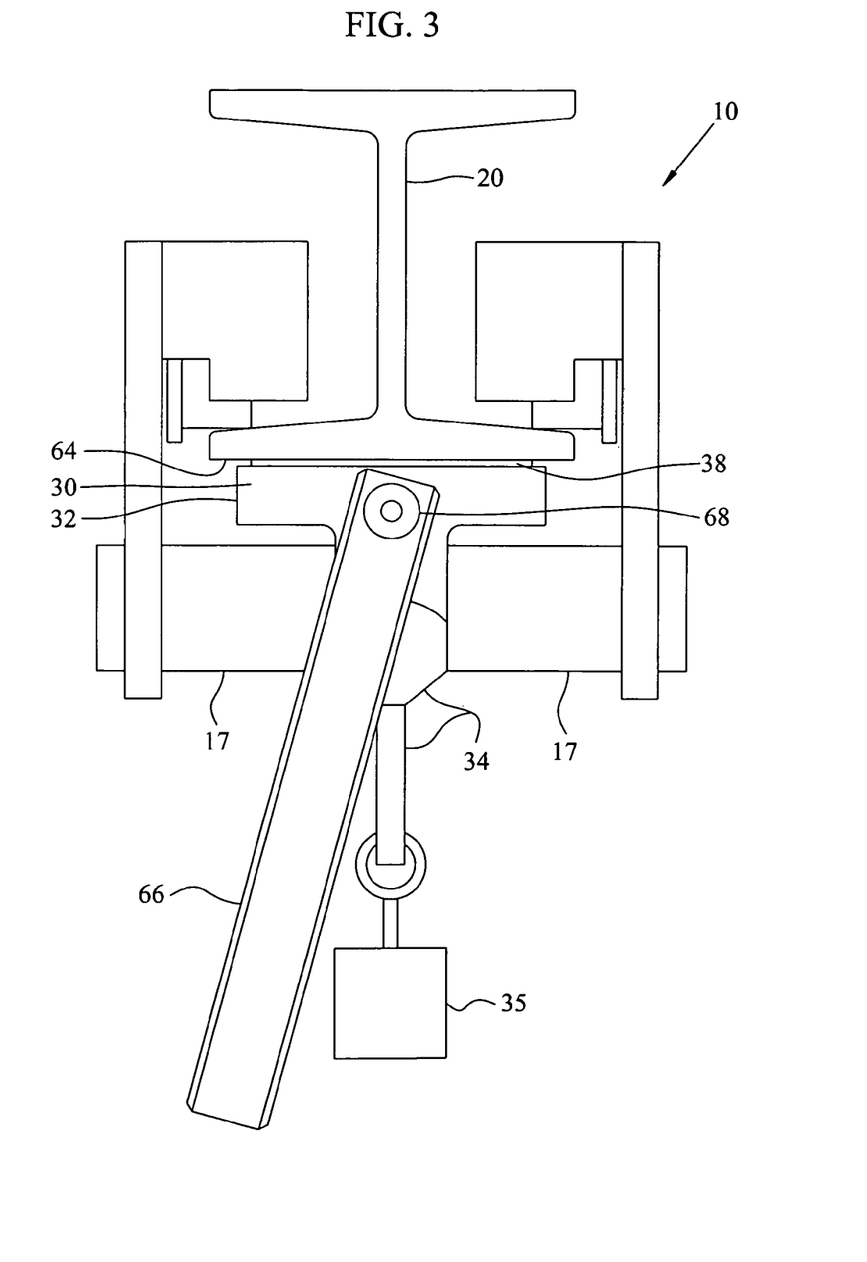
FIG. 3 is a front view of the cam actuated brake mechanism of the invention mounted on a beam trolley and engaging a supporting I or H beam in the normal position.
Figure 4:
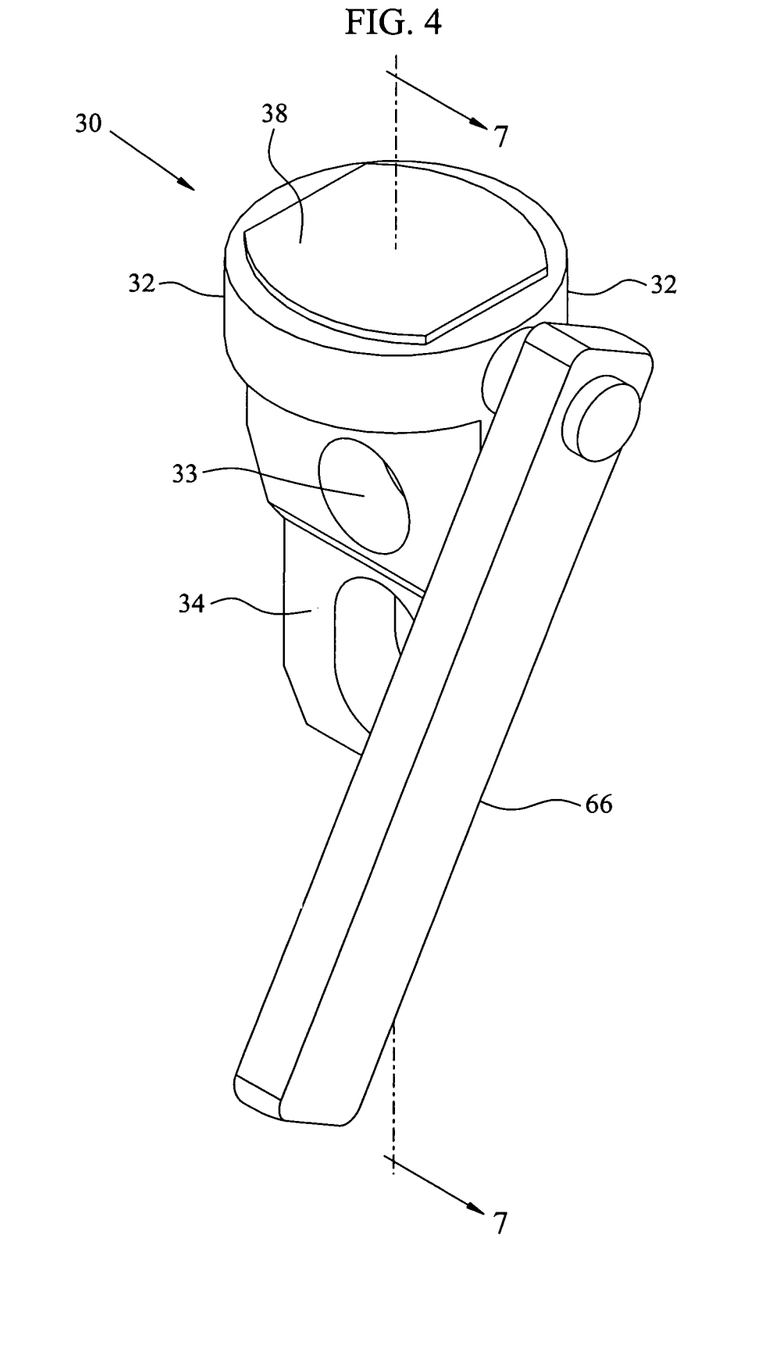
FIG. 4 is an isometric view of the cam actuated brake mechanism of the invention removed from the beam trolley.

Referring to FIGS. 3 and 4, in conjunction with FIGS. 1 and 2, a cam actuated brake mechanism 30 is mounted on a beam trolley 10 to engage an I or H beam 20 to selectively secure a loaded or unloaded beam trolley 10 on beam 20. While the beam 20 as illustrated and described herein is an I or H beam, it should be understood that the present invention will operate on any suitable beam having a flange on which a typical trolley 10 can operate.

Brake mechanism 30 has an essentially cylindrically-shaped steel body member 32 having a transverse bore 33 and an integral load bearing hoist mount 34 for bearing a load 35. Hoist mount 34 is mounted midway on laterally extending threaded bolt 15 of beam trolley 10, which extends through transverse bore 33. Some or all of spacer washers 19 of beam trolley 10 may also have to be removed when hoist mount 34 of brake mechanism 30 is included to keep the proper spacing of components of beam trolley 10 on beam 20. This feature of brake mechanism 30 of the invention allows the accommodation and modification of a number of commercially available beam trolleys and gives these modified devices improved safety and handling without compromising their inherent capabilities.

Figure 5:
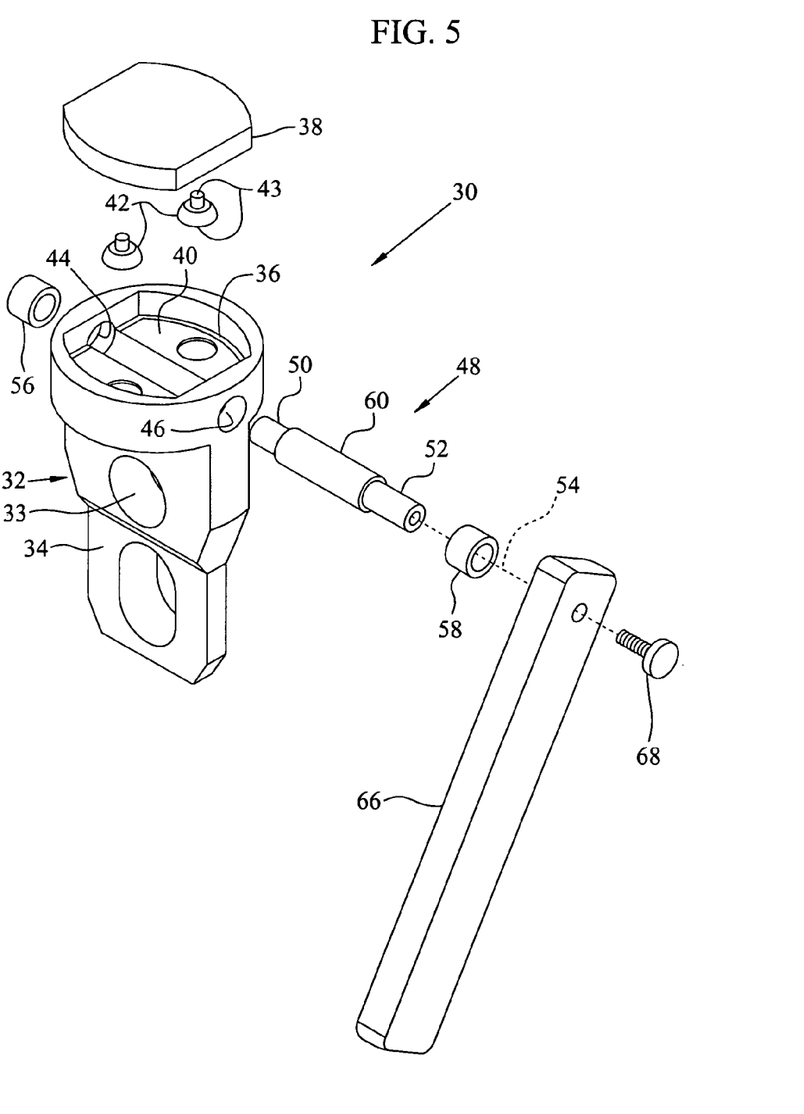
FIG. 5 is an exploded view of the cam actuated brake mechanism of the invention.

Referring also to FIG. 5, body member 32 is machined to form an upwardly facing exposed recess 36 to receive a semi-rigid brake pad 38. Brake pad 38 can be fabricated from a wide variety of known tough, wear-resistant composite materials and could be provided with a rigid backing component if desired to assure braking of brake mechanism 30 and any attached load on beam 20. Brake pad 38 is supported from the bottom 40 of the recess 36 by a pair of coiled springs 42 or other resilient means that urges pad 38 away from body member 32 and upward and outward from recess 36 adjacent to and preferably abutting beam 20. Springs 42 can be secured by appropriate mechanical or adhesive securing means 43 known in the art to brake pad 38 and body member 32 at bottom 40. Springs 42 help retain brake pad 38 in recess 36 and maintain the alignment of brake pad 38 with beam 10 to ensure that brake pad 38 contacts flat against beam 10 and to prevent the possibility of the pad's sticking in any one position during actuation of brake mechanism 30 by handle 66.

Body member 32 has aligned bores 44 and 46 in communication with recess 36 to receive a lateral pin 48. Lateral pin 48 is preferably machined from a piece of steel or other tough stock to have axially aligned cylindrical end portions 50 and 52 that are concentric with a central axis 54 of lateral pin 48. Sleeve-like bushings 56 and 58 are placed respectively between bores 44 and 46 and end portions 50 and 52 to permit selective bidirectional rotation of lateral pin 48. Lateral pin 48 is also machined with an elongate cam portion 60 that has a cross-sectional shape that is not concentric with central axis 54 and extends between end portions 50 and 52 in recess 36. Cam portion 60 is adjacent to and abuts brake pad 38 in recess 36. When cam portion 60 of pin 48 is rotated, cam portion 60 moves eccentrically to overcome the biasing force of springs 42 and displaces, or lifts, brake pad 38 away from bottom 40 of recess 36 to engage lower surface 64 of beam 20, as shown in FIG. 3. During assembly of brake mechanism 30, the cross-sectional dimensions of cam portion 60 permit its insertion into recess 36 through either of bores 44 or 46.

Figure 7:
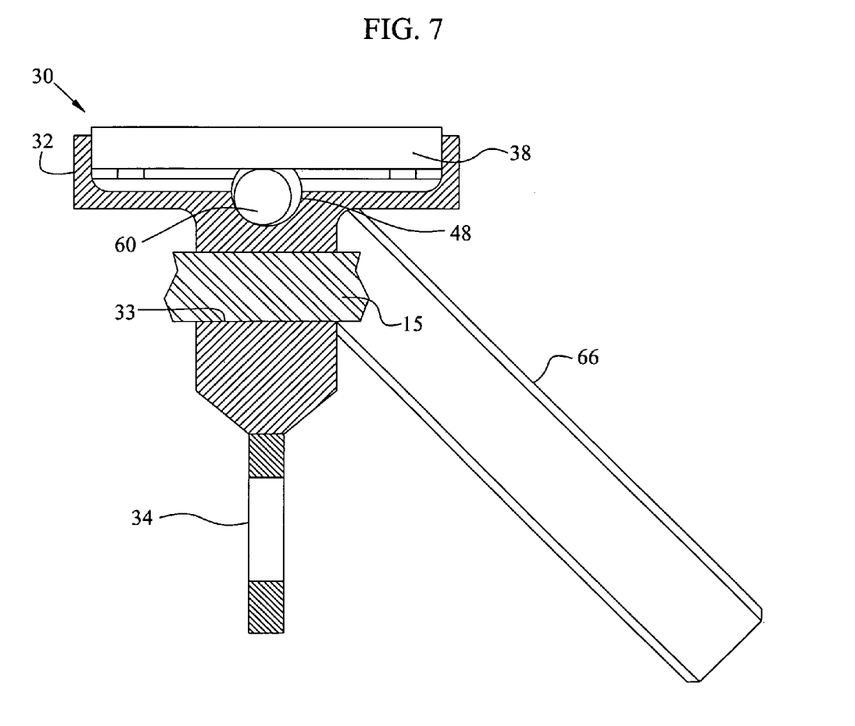
FIG. 7 is a cross sectional view of the brake mechanism of the invention taken from the rear generally along line 7-7 in FIG. 4 showing the elongate cam relative to the brake mechanism in the normal position of FIG. 3.

A rigid handle 66 is securely connected to pin 48 by a tightened threaded bolt 68 inserted through handle 66 in line with central axis 54. Rotation of handle 66 by an operator to the normal operating position shown in FIGS. 3 and 7 rotates cam portion 60 to displace brake pad 38 sufficiently to engage lower surface 64 of beam 20. In the normal operating position handle 66 is slightly off-center from vertical and the force of gravity on handle 66 causes just enough pressure to be exerted by cam portion 60 to maintain light contact between brake pad 38 and lower surface 64 of beam 20. This contact is with sufficient frictional force to hold cam portion 60 in place on brake pad 38 and create enough drag to restrict an unloaded beam trolley 10 from undesired motion along beam 20 by the influences of light ambient wind or roll of a ship underway, for example.

Figure 6:
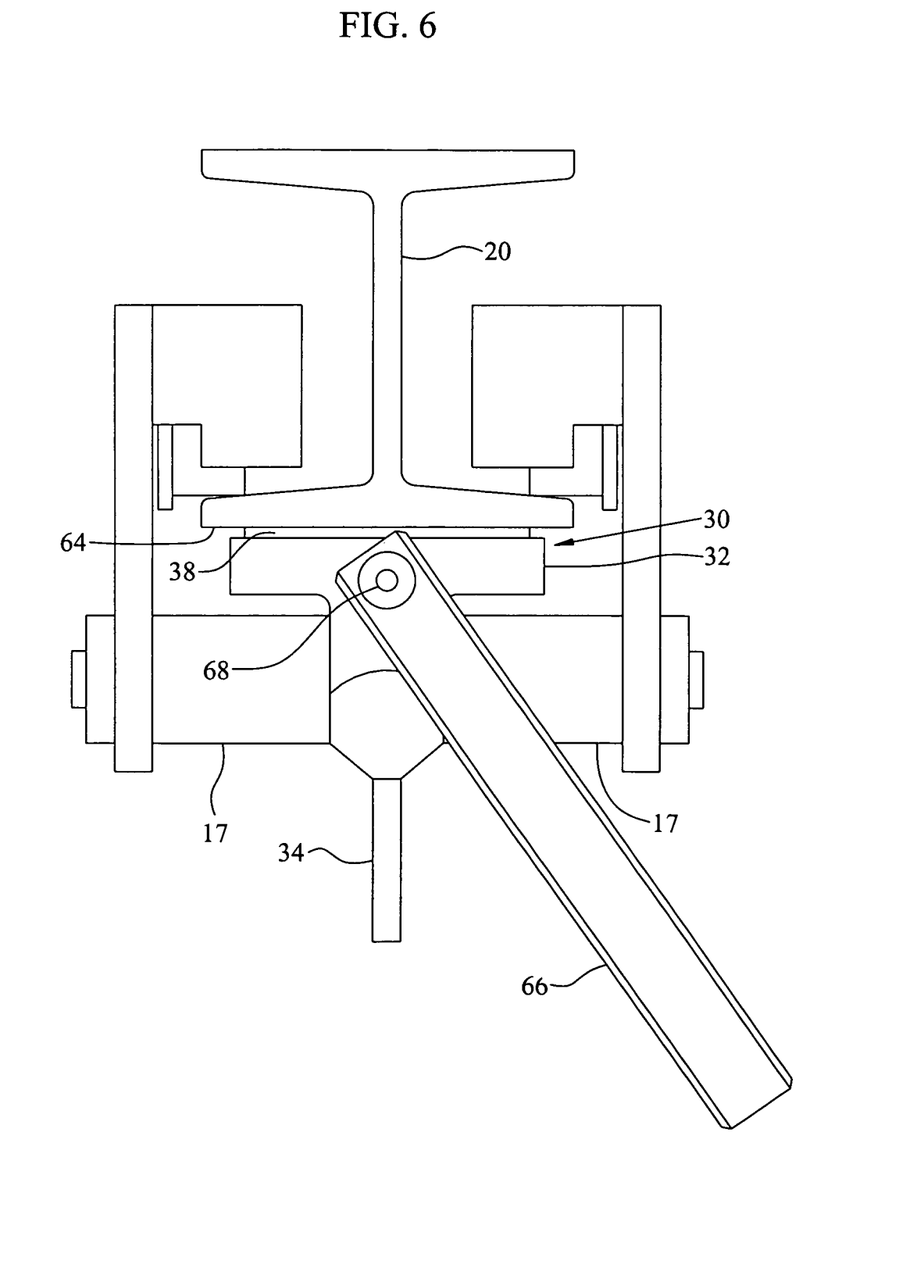
FIG. 6 is a front view of the cam actuated brake mechanism of the invention mounted on a beam trolley and securely engaging a supporting I or H beam in the locked position.
Figure 8:
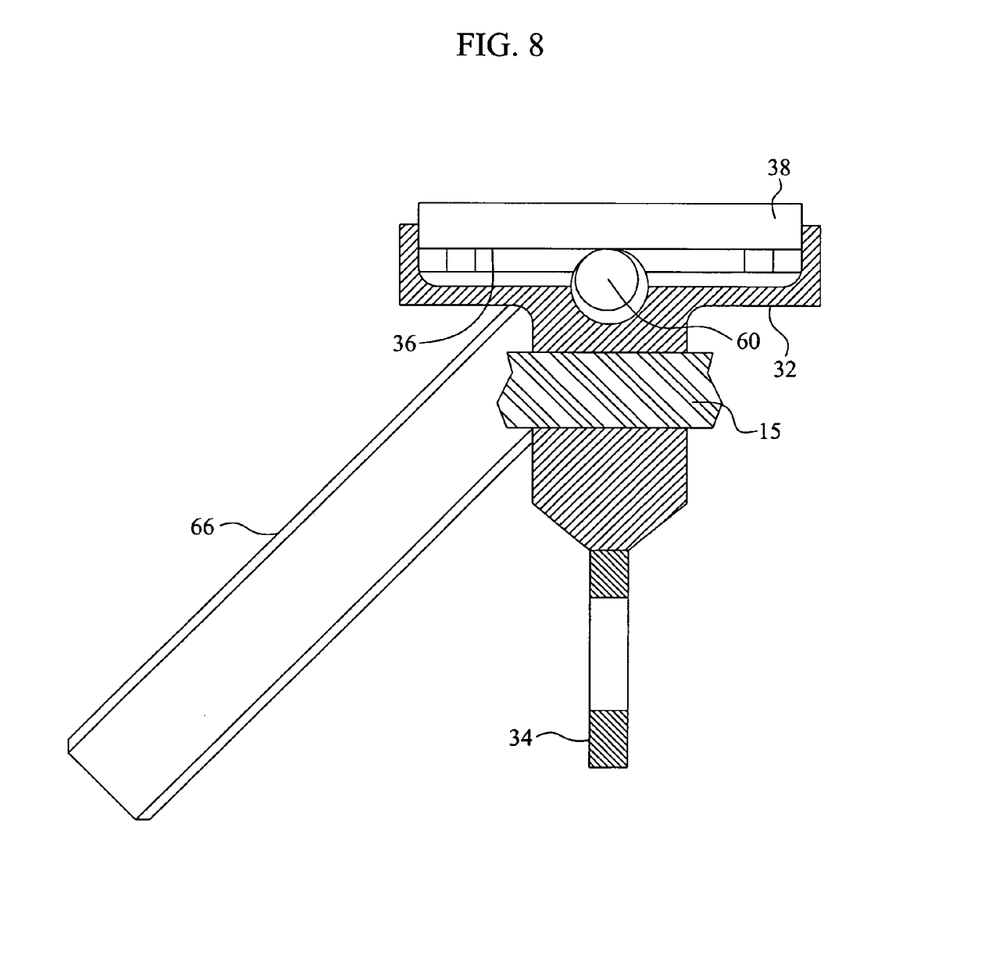
FIG. 8 is a cross sectional view of the brake mechanism of the invention of FIG. 6 taken from the rear showing the elongate cam portion relative to the brake mechanism in the locked position.

However, when a load must be positively secured under more intense ambient conditions and the trolley needs to be prevented from rolling in either direction, the operator forcefully rotates handle 66 to the locked position shown in FIGS. 6 and 8. Cam portion 60 is rotated to displace brake pad 38 sufficiently to create a large amount of brake friction between brake pad 38 and lower surface 64. This large amount of frictional force securely engages and locks brake pad 38 onto beam 20 and prevents a loaded beam trolley 10 from moving. To reset brake mechanism 30 from the locked position an operator simply swings rigid handle 66 to the normal or rest position. In either the normal or locked position, cam portion 60 is subjected to sufficient friction from brake pad 38 and brake pad 38 is made from a suitable known material as to be "self-locking", or hold it in place and maintain brake force. Therefore, cam portion 60 is unable to counter-rotate to disengage free without additional counter-rotational force being applied to the handle by an operator.

Cam actuated brake mechanism 30 provides positive locking of a beam trolley 10 to allow safe lifting of loads under unstable conditions such as while a ship is proceeding underway at sea. Transverse bore 33, hoist mount 34, cam portion 60, and brake pad 38 are disposed in an essentially vertical in-line arrangement along the length of brake mechanism 30 to reduce or eliminate the generation of destabilizing torques during actuation of brake mechanism 30. Thus, the reliable engagement of beam 20 by brake mechanism 30 is not destabilized or otherwise compromised. Cam actuated brake mechanism 30 can be adapted to a number of commercially available beam trolleys to assure a higher level of safety and reliability.

It should be readily understood that many modifications and variations of the present invention are possible within the purview of the claimed invention. It is to be understood that within the scope of the appended claims the invention may be practiced otherwise than as specifically described.

I claim:

1. A brake mechanism for a beam trolley on a beam comprising:
   a substantially solid body member having an integral hoist mount at a first end, a recess within a second end, a transverse bore adjacent to said hoist mount adapted to accept a laterally extending transverse bolt of the trolley, and a pair of axially aligned bores having a common centerline that passes through said body member and said recess;
   a rotatable lateral pin extending through said axially aligned bores, said lateral pin having a central axis and an integral cam portion extending across said recess, said cam portion having a substantially cylindrical cross-sectional shape that is not concentric with said central axis;
   a brake pad disposed in said recess and abutting said cam portion; and
   a rigid handle connected to said lateral pin for rotating said lateral pin and said cam portion to displace said brake pad against said beam.

2. The brake mechanism of claim 1 wherein said brake pad is made of a material that frictionally resists relative movements between said brake pad and said beam and between said brake pad and said cam portion.

3. The brake mechanism of claim 2 further comprising:
cylindrical end portions disposed on opposite ends of said lateral pin; and
a bushing disposed between each said axially aligned bore and one of said cylindrical end portions to permit rotational displacement of said lateral pin within said axially aligned bores.

4. The brake mechanism of claim 3 further comprising:
a pair of coiled springs disposed within said recess between said body member and said brake pad and on opposite sides of said lateral pin, each of said springs having a first end coupled to said brake pad and a second end coupled to said body member in said recess, wherein said springs are tensioned to urge said brake pad away from said body member upward and outward from said recess.

5. A beam trolley for moving a load along a suspended horizontal flanged beam, comprising:
first and second vertical side plates;
a pair of load bearing trolley wheels rotatably mounted on each said first and second side plate adjacent to an upper end thereof;
a transverse bolt having opposite ends coupled to said first and second side plates adjacent to a lower end thereof, wherein the length of said bolt is chosen so that opposing pairs of said trolley wheels can be spaced apart to rest on opposing sides of the flange of the beam when the trolley is mounted on the beam;
a body member having an integral hoist mount at a first end, a recess in a second end, a pair of axially aligned bores having a common centerline that passes through said body member and said recess, and a transverse bore adjacent to said hoist mount, wherein said bolt extends through said transverse bore and is coupled to said body member so that said recess is proximal to and facing the flange of the beam when the trolley is mounted on the beam;
a rotatable lateral pin extending through said axially aligned bores, said lateral pin having a central axis and a cam portion extending across said recess, said cam portion having a substantially cylindrical cross-sectional shape that is not concentric with said central axis;
a brake pad disposed in said recess, said brake pad having a bottom surface abutting said cam portion and a top surface adjacent to the flange of the beam when the trolley is mounted on the beam; and
a rigid handle connected to said lateral pin for rotating said lateral pin and said cam portion to displace said brake pad against said beam.

6. The beam trolley of claim 5 further comprising:
a pair of coiled springs disposed within said recess between said body member and said brake pad and on opposite sides of said lateral pin, each of said springs having a first end coupled to said brake pad and a second end coupled to said body member in said recess, wherein said springs are tensioned to urge said brake pad away from said body member upward and outward from said recess.

7. The beam trolley of claim 5, further comprising at least one spacer washer disposed on said bolt to adjust the spacing between said opposing pairs of said trolley wheels.

\* \* \* \* \*